(12) United States Patent
Wrench et al.

(10) Patent No.: US 7,478,035 B1
(45) Date of Patent: Jan. 13, 2009

(54) VERBAL CLASSIFICATION SYSTEM FOR THE EFFICIENT SENDING AND RECEIVING OF INFORMATION

(75) Inventors: Lisa Marie Wrench, Windsor, CA (US); Harry Kirke Wrench, Windsor, CA (US)

(73) Assignee: Eclarity, Inc., Windsor, CA (US)

( * ) Notice: Subject to any disclaimer, the term of this patent is extended or adjusted under 35 U.S.C. 154(b) by 603 days.

(21) Appl. No.: 10/129,408

(22) PCT Filed: Oct. 31, 2000

(86) PCT No.: PCT/US00/29958

§ 371 (c)(1),
(2), (4) Date: May 2, 2002

(87) PCT Pub. No.: WO01/33431

PCT Pub. Date: May 10, 2001

Related U.S. Application Data

(60) Provisional application No. 60/163,078, filed on Nov. 2, 1999.

(51) Int. Cl.
G06F 17/30 (2006.01)
G06F 17/28 (2006.01)

(52) U.S. Cl. ............... 704/7; 704/201; 704/8; 704/9; 704/10

(58) Field of Classification Search ........... 704/7–10
See application file for complete search history.

(56) References Cited

U.S. PATENT DOCUMENTS

| | | | | |
|---|---|---|---|---|
| 4,914,590 A | * | 4/1990 | Loatman et al. ............... 704/8 |
| 5,754,938 A | * | 5/1998 | Herz et al. ................... 725/116 |
| 5,897,639 A | * | 4/1999 | Greef et al. ............. 707/103 R |
| 6,014,626 A | * | 1/2000 | Cohen ......................... 704/275 |
| 6,108,640 A | * | 8/2000 | Slotznick ..................... 705/26 |
| 6,119,078 A | * | 9/2000 | Kobayakawa et al. .......... 704/3 |
| 6,144,934 A | * | 11/2000 | Stockwell et al. .............. 704/1 |
| 6,349,275 B1 | * | 2/2002 | Schumacher et al. .......... 704/8 |
| 6,484,136 B1 | * | 11/2002 | Kanevsky et al. .............. 704/9 |
| 6,772,139 B1 | * | 8/2004 | Smith, III ...................... 707/3 |

* cited by examiner

*Primary Examiner*—David R Hudspeth
*Assistant Examiner*—Abdelali Serrou
(74) *Attorney, Agent, or Firm*—Leonard Tachner

(57) ABSTRACT

A verbal classification system and method for the efficient sending and receiving of desired information is described. Web-site proprietors (314) and Internet marketers provide a host server (320) with descriptive data about their web-sites and messages (336) according to a predefined verbal hierarchy of nouns, verbs and modifiers. An Internet user creates a role or roles (340) that describes desired information according to the same predefined verbal hierarchy of nouns, verbs, and modifiers and transmits that role (340) to the host server (320), provides the Internet user with desired web-site addresses (336) and message by matching the role (338) to web-site and message descriptive data (336). The Internet user may access a web-site using one or more roles (340) and the web-site may provide the user with custom content by matching content (338) to the Internet user's role and roles (340). The host server (320) collects role information (340) from Internet users and web-sites to generate marketing and demographics data (346) about Internet users and web-sites (328). Internet user privacy is protected because role data (340) is encrypted and contains no personal identification information (348).

23 Claims, 8 Drawing Sheets

VERBAL CLASSIFICATION SYSTEM FOR THE EFFICIENT SENDING AND RECEIVING OF INFORMATION

CROSS-RELATED APPLICATIONS

This application takes priority from Provision Application Ser. No. 60/163,078 filed Nov. 2, 1999.

BACKGROUND OF THE INVENTION

1. Field of the Invention

The present invention relates to a system and method for sending and/or receiving information. More specifically, the present invention relates to a verbal (i.e., through words or symbols either written or spoken) classification system and method for the efficient sending and/or receiving of desired information.

2. Discussion of the Background

The Internet, and more particularly the World Wide Web, is like a landscape expanding at a rapid rate, without a map of its terrain or any organization of the web-sites within that landscape. This lack of infrastructure mapping and organization is a critical problem for both Internet users, who may be unable to access desired information, and web-site proprietors, who may be unable to provide information to a desired audience.

While some web-sites offer indices of the World Wide Web to assist Internet users in accessing desired information, these indices do not permit true granular search capabilities. These indices also do not provide a method for web-site proprietors to offer their web-sites directly to a target audience. These indices are also limited because their ability to track new Internet web-sites is constrained by the resources of the single web-site proprietor that maintains each index.

Internet users may use search engines to locate specific web-sites, but search engines typically rely on over-inclusive, word-based queries that generate undesired results. Thus, Internet users that use search engines may be unable to find the web-site that they are interested in, and web-site proprietors that rely on search engines to attract Internet users must compete with both related and unrelated sites that may be included in search query results. Search engines are also disadvantageous in that they require the Internet user to deduce what keyword or keywords will generate a list of desired web-sites. Finally, because search engines use algorithms that do not connect subject matter with actions, they cannot aid Internet users who wish to locate information based on actions (e.g., "buying" a product rather than "getting information" about it) or modifiers (e.g., information about a subject limited to a specific time period, or to a specific geographic area), or web-sites that wish to receive targeted traffic based on the same criteria.

In addition to a lack of organization, another problem facing the Internet is that the Internet's user community is faceless and difficult to know. Because Internet users are essentially "invisible," Internet marketers unable to identify a target audience may resort to a practice known as "spamming" in which electronic messages containing marketing information are sent indiscriminately to a large group of Internet users. Not only is spamming inefficient from the Internet marketer's point of view, as there is no way to be sure that electronic messages are reaching an interested audience, it is also highly frowned upon by the Internet's user community, who are forced to contend with the receipt of undesired "spam" messages.

Furthermore, because Internet users are "invisible," web-site servers cannot present an Internet user with a custom web page or banner advertisement targeted to that user's interests until after the Internet user has accessed a server's web-site. This is because an Internet advertising system can only determine an Internet user's interests by tracking the Internet user's activity after accessing a web-site. This kind of tracking has generated concerns about Internet user privacy.

Finally, because Internet users are "invisible," market research based on server statistics, cookie tracking and the like, is also limited to tracking usage passively, after a user has arrived at a web-site. Market research on Web behavior and demographics today is also limited in that it uses a segment of the Web via a relatively small sampling. No existing market research services can provide a mass sampling of information about Internet users, web-sites, or can compare or contrast information about Internet users' interests to information about the web-sites they visit.

SUMMARY OF THE INVENTION

As communication involves language, the present invention involves a novel approach to capturing human intention, and converting human communication into a uniform protocol that can be sent, received, associated with data or physical objects, used to index, store and retrieve information, or accomplish transactions in a uniform fashion. This language can be used to perform automated transactions, communicate routing, process stages, or other complex human intentions. This uniform language structure can be used to communicate details about a human being, a transaction, a living or inanimate object, or any data object or type. It can communicate what instructions the creator of the data wishes to be attached to that information or object, and used to communicate what rules and/or intentions are intended or acceptable on the part of the receiver.

The invention also includes ways for individuals to describe themselves and their possessions in a unique way, and create descriptions of segment aspects of themselves and/or their interest areas or possessions, into discrete functional portions to further aid description and organization of their tasks and associated data.

Due to the robust language framework incorporated herein, the invention makes it possible to communicate data, related state of mind, emotions, timeframe, intentions related to the data, and make complex requests that can be understood and acted upon by others or computer systems. As the language framework is limited only to the vocabulary set possible in any language, and built into the computer interfacing to it, the ability to describe oneself, one's data, one's possessions, one's intentions, is limited only to what a person using the language framework composing sentences is capable of creating, and the receiving/decoding person or computer or other device is capable of responding to.

The invention enables individuals to describe themselves, data and actions as response scenarios to potential requests from other individuals in the same language format as is possible on the part of the individual issuing a request. Thus, transactions or processes can be conducted based on the criteria or preferences set by each individual, instead of being driven by the intentions of one side or the other.

The invention makes possible a new form of electronic language protocol that can be uniformly applied across cultures, spoken language sets, data types, and computer or other systems. This uniform language structure can be used in conjunction with other indexes, organizational structures, etc. to more fully inform and empower the processing of transactions between 2 parties.

The invention makes possible the creation of new and more efficient methods for data routing, storage, retrieval, caching, optimization of storage systems, filtering, agent and permission systems, based on understanding data flow in terms of the language framework associated to it, and more precise understanding of the intention of the individual making said requests.

The invention makes it possible to analyze behavior and processes as they are related both to the data associated with those behaviors, and the stated intentions and self-descriptions of the individuals initiating those processes. In like fashion, data, behavior, measurable factors, such as time, region, can be analyzed and compared against all the associated variables contained within the invention's language framework and the inventions framework for describing and characterizing people and their possessions and activities.

The invention makes it possible for an individual to make a set of descriptions, rules and instructions, which can be interpreted by a computer and acted upon on behalf of the user. These instructions can be associated with data, goods or services, and can perform as independent agents for the author. These instructions can be associated with any type of object or data, associated with any aspect of the person, or other self-defined criteria.

The present invention provides a verbal classification system and method for the efficient sending and/or receiving of desired information. A system in accordance with the invention includes a host server, a web-site server, and one or more user personal computers. The system also includes software and one or more databases which provide a predefined hierarchy of "nouns", "verbs", and "modifiers" that are used to send and/or receive desired information, thus allowing users, web-site proprietors, and other on-line retailers to communicate in an efficient manner.

The invention is advantageous in that it allows a user (e.g., an Internet user) to directly access desired web-sites without having to sort through undesired web-sites or determine the best keyword or keywords that will generate a list of desired web-sites.

Another benefit of the invention is that it permits web-site proprietors and Internet marketers to reach their intended audience more directly and cost-effectively.

Another advantage of the invention is that it provides a decentralized method for indexing web-sites that is not constrained by the resources of a single web-site proprietor and that remains current with the growth of the Internet.

Yet another advantage of the invention is that it allows web-site servers to present custom content and advertisements to a specific Internet user without having to track an Internet user's activity.

The invention is also advantageous in that it permits an Internet user to receive only those messages that correspond to the Internet user's stated areas of interest while avoiding "spam" messages and other communications outside those areas.

Another benefit of the invention is that it permits market research and demographics analysis based on an Internet user's stated interests as opposed to passive tracking of an Internet user's activity that may invade an Internet user's privacy.

Yet another benefit of the invention is that it allows market research and demographics analysis based on a mass-sampling of information about Internet users, web-sites, and a comparison of Internet users' interests to the web-sites they visit.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof as well as the appended drawings.

BRIEF DESCRIPTION OF THE DRAWINGS

The accompanying drawings are included to provide a further understanding of the invention and are incorporated in and constitute a part of this specification. The drawings illustrate the preferred embodiment of the invention and together with the description serve to explain the principles of the invention.

DETAILED DESCRIPTION OF THE PREFERRED EMBODIMENTS

Figure 1A:
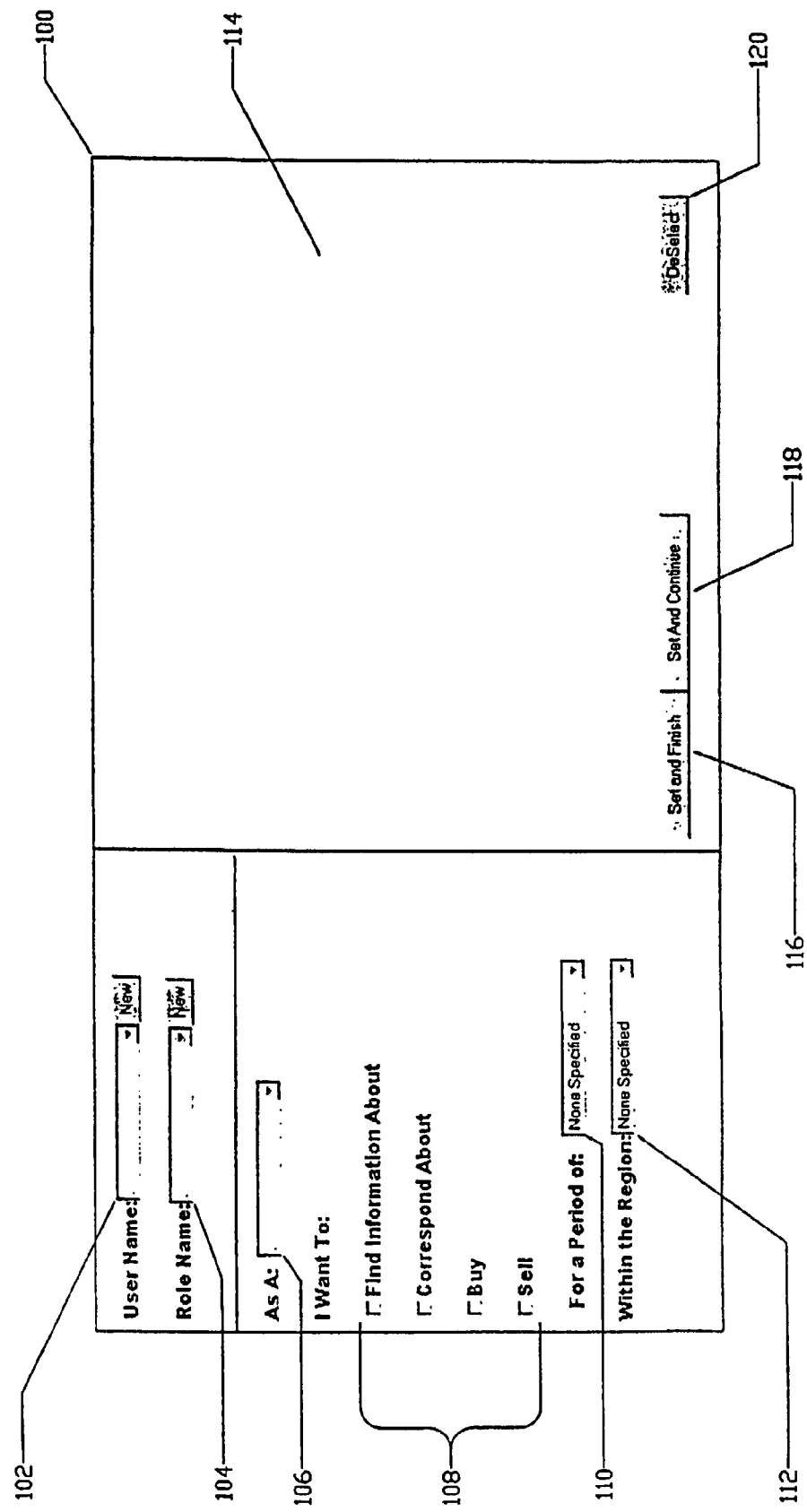
FIGS. 1A-1F are a depiction of a graphical user interface in accordance with the present invention.

A system and method in accordance with the present invention will now be described with reference to FIGS. 1-3, where like reference numbers indicate like elements. Also, in the figures, the left-most digit of each reference number corresponds to the figure in which the reference number is first used. Although several preferred embodiments of the present invention are particularly shown and described below, one of ordinary skill in the art will appreciate that various changes in forms and details may be made without departing from the spirit and scope of the invention as defined in the appended claims.

The invention provides a verbal classification system and method for the efficient sending and/or receiving of desired information. In this preferred embodiment, the sending and/or receiving of information occurs over the Internet. It will be appreciated by one of ordinary skill in the art, however, that the system and method of the invention can be practiced in any communication system in which information is sent and/or received, including various types of wireless, optical, or hybrid communication systems. For example, the invention can be practiced on home networks, wireless networks, control networks, corporate intranets, broadcast media, library science systems, or thin-client information retrieval systems in which devices such as cellular phones, personal digital assistants, palm-top computers or automotive on-board computers are used to retrieve information. The invention can also be practiced in traditional document filing systems such as filing systems that use paper media, microfilm or microfiche systems.

As will be described in detail below, a web-site proprietor, an Internet marketer and an Internet user of this preferred embodiment each provide a statement or set of statements that describes the information they are interested in sending or receiving. These statements are used to facilitate effective and efficient communication within the system. The web-site proprietor provides a statement or set of statements about the content of his web-site. The Internet marketer also provides a statement or set of statements about the content of the messages he wishes to distribute. Similarly, the Internet user, in turn, provides a statement or set of statements about the web-sites he wishes to access or the messages the user wishes to send or receive.

Each statement is generated by selecting from a predetermined or predefined verbal hierarchy of "nouns," "verbs," and "modifiers." As defined herein, "nouns" are descriptors that describe subject matter areas, "verbs" are descriptors that describe activities relating to those subject matter areas, and "modifiers" are descriptors that in some way delimit the scope of subject matter areas and activities. In this preferred embodiment, the predefined verbal hierarchy of subjects is organized in a tree-like structure, in which each level of the tree is characterized by an increasing level of specificity. The nouns, verbs and modifiers are comprised of a word or words from the English language. However, it will be appreciated by one of ordinary skill in the art that nouns, verbs and modifiers can be comprised of any verbal information, including a word or words in a language other than English, codes, or any symbolic or graphical representations of a word or words or a thing or things. (Languages other than English, with a grammar structure different from English, can be cross-referenced to each other, much like a translator would do)

In accordance with this preferred embodiment of the invention, the Internet user is provided with the address of a desired web-site or with desired messages from an Internet marketer or another Internet user by matching the Internet user's statements with those of a web-site proprietor, Internet marketer or other internet user. Thus, the invention allows an Internet user to directly access desired web-sites without having to use a search engine, which requires the Internet user to deduce what keyword or keywords will generate a list of desired web-sites and can also require the Internet user to sort through undesired web-sites. The invention thus also allows web-site proprietors and Internet marketers to directly reach a target audience, and allows Internet marketers to do so without resorting to "spamming" (i.e., sending messages indiscriminately to a large group of Internet users). The avoidance of unwanted "spam" messages is also a benefit to the Internet user.

Also, because the invention allows individual web-site proprietors to describe the contents of their web-sites, it provides a decentralized method for indexing web-sites that is not constrained by the resources of a single web-site proprietor and that remains current with the growth of the Internet.

In addition to web-site addresses and messages, other information can be sent or received according to the invention, including electronic coupons, streaming audio and video, public service announcements, match results from newsgroups or private bulletin boards, and scheduling information regarding on-line forums and chat sessions, broadcast media programming, or community events. Additionally, the invention can be used to send or receive various types of messages (e.g., electronic messages), including community-based messages, political campaign messages, recall notices, "virtual community" or interest group messages, professional organization announcements, and regulatory announcements.

The invention can also be used to interface with other systems for classifying information including systems in which well-known codes or indices are used for classifying information. For example, existing universal price code systems in which products are identified by a unique price code can be improved upon by describing the same products according to a statement or set of statements selected from a predefined verbal hierarchy of nouns, verbs and modifiers. The invention can thus allow mapping between the verbal classification system and the universal price code system.

The manner by which an Internet user provides descriptive data describing the information the user wishes to receive will be further described in reference to FIGS. 1A-1F, which depict a graphical user interface (GUI) 100 of a preferred embodiment. GUI 100 is used by an Internet user to generate a statement or set of statements describing the type of information that the Internet user wishes to access by selecting from a predefined verbal hierarchy. The statement or set of statements describing the type of information the Internet user wishes to access is called a "role". The Internet user can use GUI 100 to create one or more roles, which are then stored on the Internet user's personal computer (PC). In this preferred embodiment, GUI 100 is a "point-and-click" interface, in which an input device (e.g., mouse) is used to direct a cursor to select or activate items on the monitor screen of the Internet user's PC.

In this preferred embodiment, the Internet user accesses GUI 100 on the Internet user's PC. GUI 100 will then be displayed on the monitor of the Internet user's PC. FIG. 1A depicts an initial appearance of GUI 100 as displayed to the Internet user. GUI 100 includes a user name field ("User Name") 102, a role name field ("Role Name") 104, a proficiency modifier field ("As a:") 106, verb checklist ("Find Information About," "Correspond About," "Buy," "Sell") 108, a temporal modifier field ("For a period of:") 110, a geographic modifier field ("Within the Region:") 112, and a display area 114.

As shown in FIG. 1A, the display area 114 of GUI 100 is initially blank. The Internet user begins by entering his or her user name. If the Internet user wishes to create a new user name, the user must enter a user name in user name field 102 and activate a "new" button adjacent to that field. If the Internet user already has a user name (because the user has previously created a role), the Internet user can activate a downward arrow button next to user name field 102 and select the user name from a drop-down menu of pre-existing user names.

The Internet user then selects a role name. If the Internet user wishes to create a new role, he must enter a role name in role name field 104 and activate a "new" button adjacent to that field. If the Internet user wants to access a role that the user has already generated (because the user has previously created a role), the Internet user can activate a downward arrow button next to role name field 104 and select the role name from a drop-down menu of pre-existing role names. The pre-existing role data corresponding to that role name is then loaded into GUI 100.

Figure 1B:
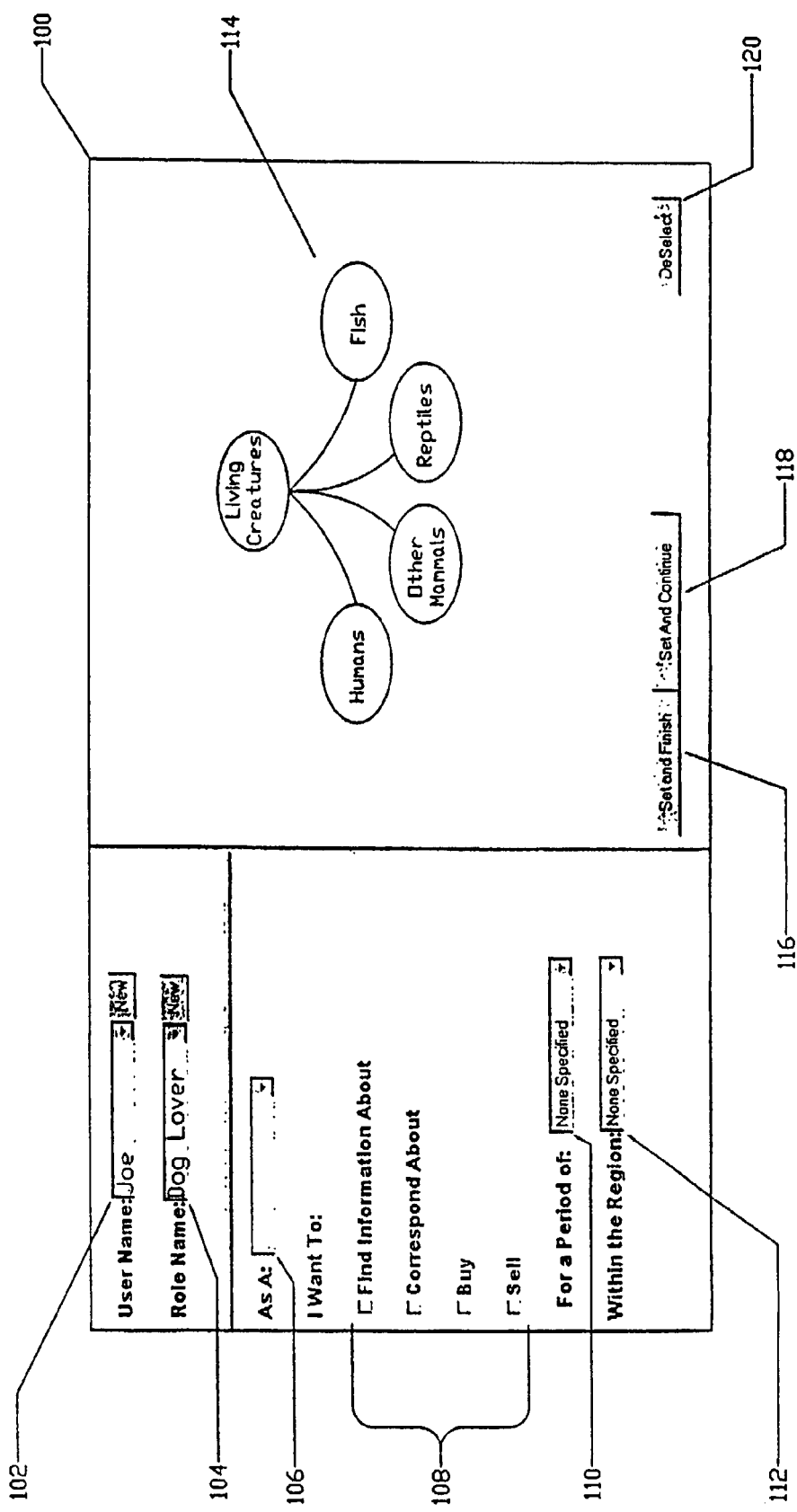

FIGS. 1B-1F, illustrate a particular example of a user's interaction with this preferred embodiment. As shown in FIG. 1B, the Internet user has selected the user name "Joe" and the role name "dog lover." Once the Internet user has selected a user name and role name, GUI 100 displays a portion of the predefined verbal hierarchy in display area 114. If the Internet user has selected a new role name, the noun or nouns at the highest level of the predefined verbal hierarchy will be displayed in display area 114. If the Internet user has selected a pre-existing role name, then the noun or nouns at the highest level of the predefined verbal hierarchy at which that role differs in any way from any other role stored on the Internet user's PC will be displayed in display area 114.

Each level in the predefined verbal hierarchy is comprised of one or more nouns, each of which describes a general subject matter area. For example, in FIG. 1B, GUI 100 displays the noun "Living Creatures", which describes the general subject matter area of all living creatures, in display area 114. Each noun in the predefined verbal hierarchy can be associated, in turn, with one or more nouns describing more specific subject matter areas within that general subject matter area. GUI 100 displays these nouns as depending from the broader subject matter areas to which they are related. For example, as shown in FIG. 1B, GUI 100 displays the more specific subject matter areas described by the nouns "Humans," "Other Mammals," "Reptiles" and "Fish". as depending from the noun "Living Creatures." Each of these dependent nouns can, in turn, be associated with one or more nouns describing even more specific subject matter areas within the predefined verbal hierarchy.

Figure 1C:
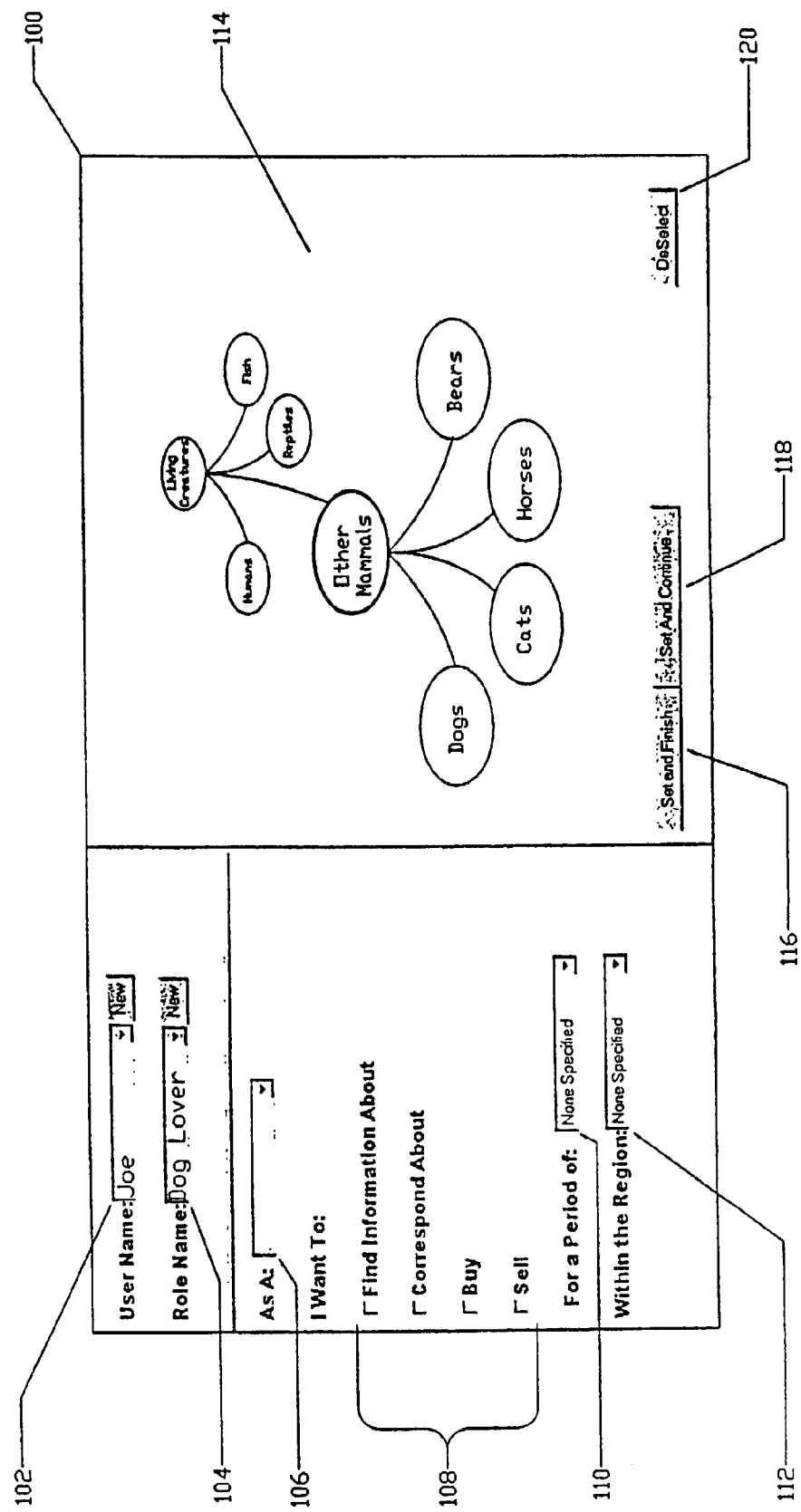
Figure 1D:
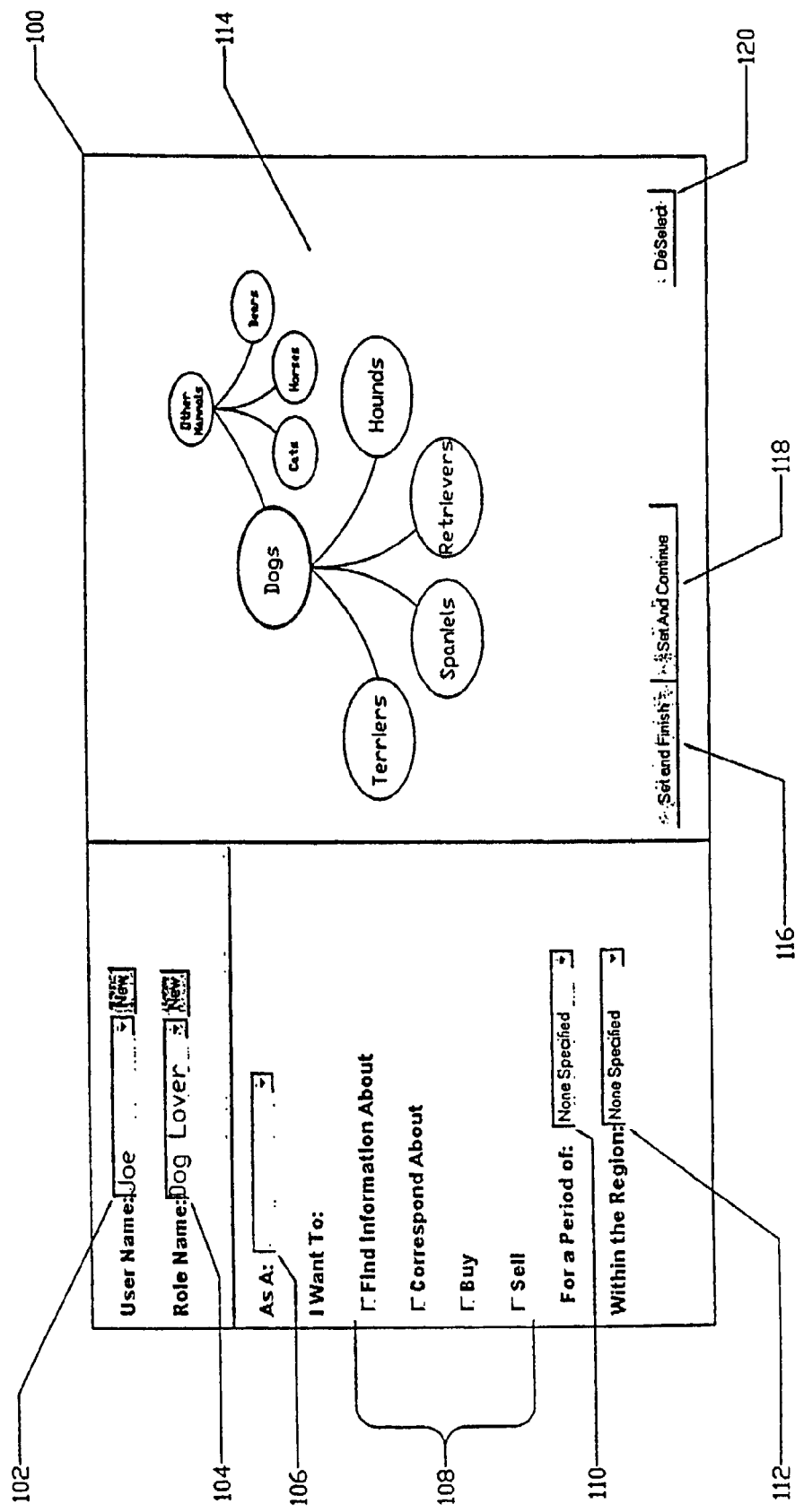
Figure 1E:
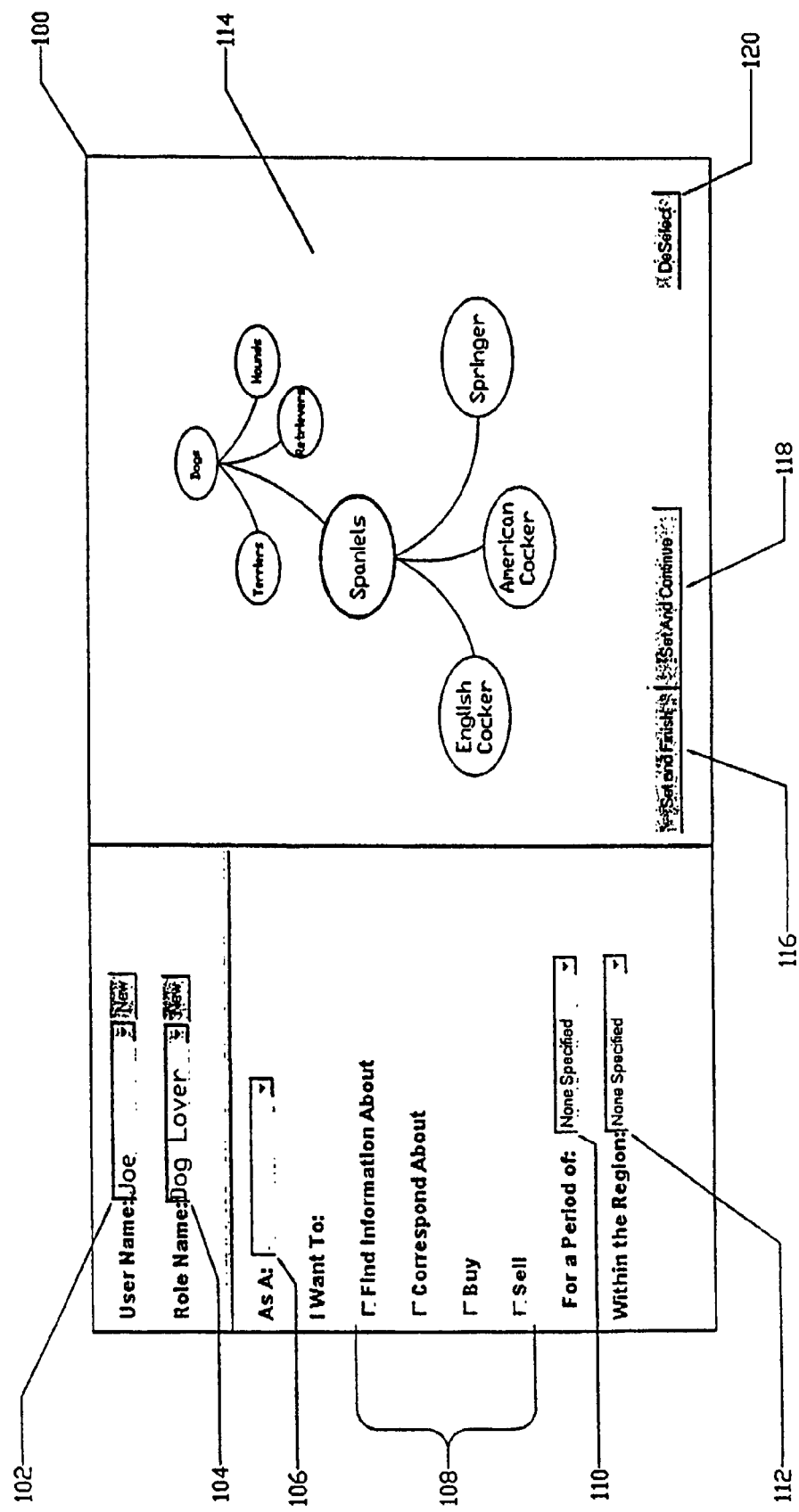

If the Internet user is interested in seeing whether any of the nouns displayed in display area 114 is associated with more specific subject matter areas, the Internet user uses GUI 100 to select a noun in display area 114. If the noun selected by the Internet user is associated with more specific subject matter areas within the predefined verbal hierarchy, then GUI 100 will display the nouns corresponding to the more specific subject matter areas. For example, as seen in FIG. 1C, when the Internet user selects the noun "Other Mammals," GUI 100 displays the more specific subject matter areas described by the nouns "Dogs," "Cats," "Horse's" and "Bears" in display area 114. As seen in FIG. 1D, when the Internet user selects the noun "Dogs," GUI 100 displays the more specific subject matter areas described by the nouns "Terriers," "Spaniels," "Retrievers" and "Hounds" in display area 114. As shown in FIG. 1E, when the Internet user selects the noun "Spaniels," GUI 100 displays the more specific subject matter areas described by the nouns "English Cocker," "American Cocker" and "Springer" spaniels in display area 114.

If the noun selected by the Internet user is not associated with any more specific subject matter areas within the predefined verbal hierarchy, then GUI 100 will not display any more nouns. For example, in reference to FIG. 1F, because the subject matter area described by the noun "Springer" spaniel is not associated with any more specific subject matter areas within the predefined verbal hierarchy, when the Internet user selects the noun "Springer," spaniel no additional nouns are displayed by GUI 100 in display area 114.

It will be appreciated that, by consecutively selecting dependent nouns displayed by GUI 100 in display area 114, the Internet user can navigate from general subject matter areas at the top of the predefined verbal hierarchy down to the most specific subject matter areas. When the Internet user is navigating through the predefined verbal hierarchy, GUI 100 displays nouns corresponding to a previously selected level of the predefined verbal hierarchy on a smaller scale than nouns corresponding to currently selected levels, or does not display them at all. For example, in FIG. 1E, GUI 100 displays the nouns corresponding to the previously selected level of subject matter areas "Terriers," "Retrievers" and "Hounds" on a smaller scale than the nouns corresponding to currently selected levels of subject matter areas. The nouns corresponding to the previously selected level that includes the subject matter area "Other Mammals," from which the noun "Dog" depends, is not displayed at all within display area 114.

When the Internet user has located the subject matter area or areas about which he wishes to receive information, the Internet user can use GUI 100 to choose that subject matter area or areas. GUI 100 permits the Internet user to choose a single subject matter area by choosing a single noun, multiple subject matter areas by choosing multiple nouns, or entire branches of subject matter areas by choosing a single noun and all the nouns that depend from it. At any time the Internet user can undo choices he has made by activating the "Deselect" button 120 within display area 114.

Figure 1F:
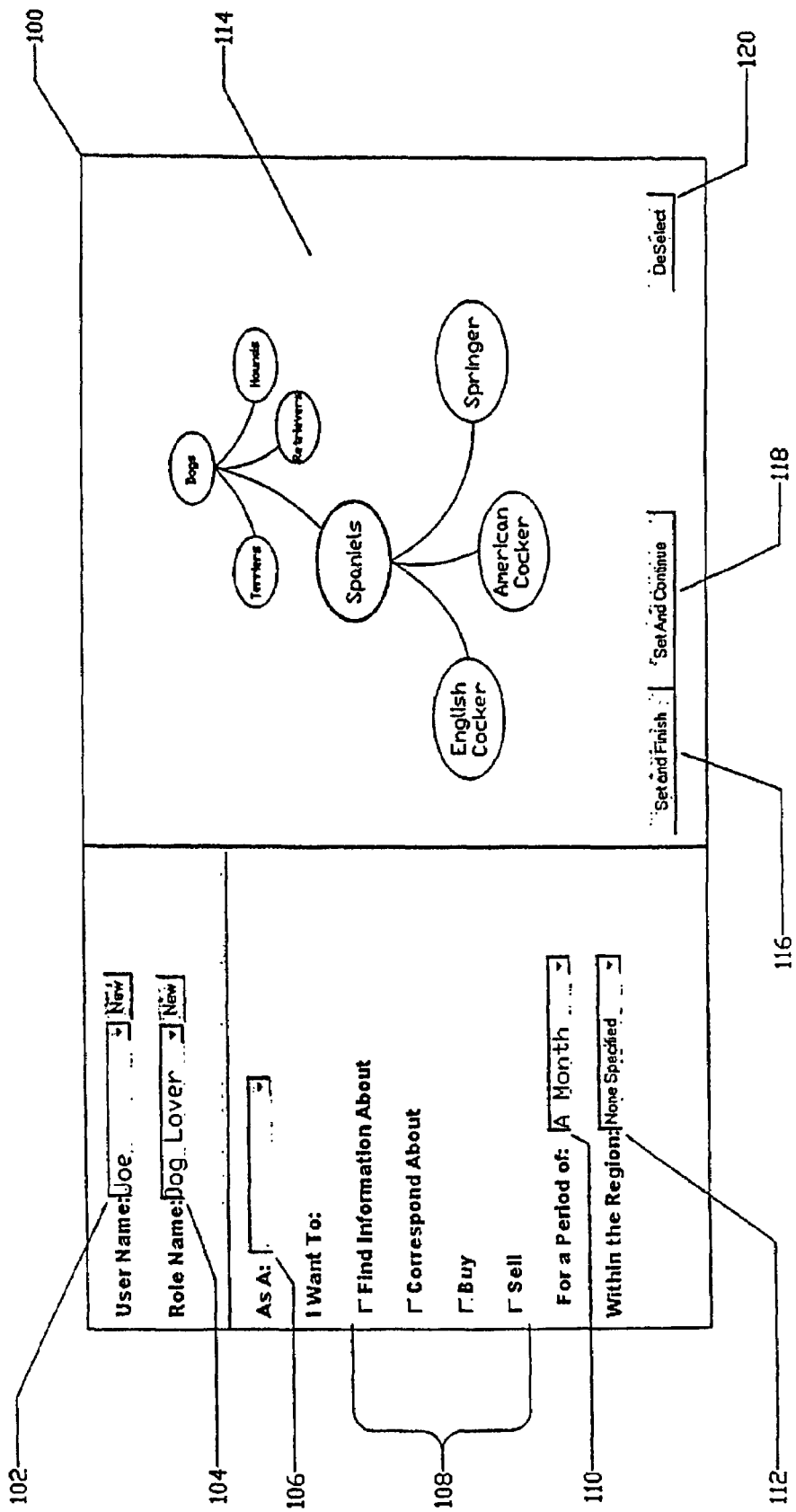

The Internet user can also use GUI 100 to choose one or more verbs that describe an activity or activities in which the Internet user is interested. For example, as shown in FIG. 1F, the Internet user can choose one or more verbs by checking any of the boxes in verb checklist 108. The Internet user can choose from the verbs "Find Information About," "Correspond About," "Buy," or "Sell." As depicted in FIG. 1F, the Internet user, who has already chosen the subject matter area "Springer," then chooses the verb "Find Information About" by clicking on the box next to the verb "Find Information About" in verb checklist 108. As will be appreciated by one of ordinary skill in the art, GUI 100 can be implemented to provide any collection of verbs and to present the choice of verbs in a drop-down menu format as opposed to a checklist, or display a choice of verbs in display area 114 depending from selected nouns.

The Internet user can also choose "modifiers" (proficiency, temporal, geographic) to further delimit or focus the scope of information that the user is interested in accessing. For example, as shown in FIG. 1F, the Internet user can choose from one or more of a variety of proficiency modifiers by activating a downward arrow button next to proficiency modifier field 106. The Internet user will then be presented with a drop-down menu of proficiency modifiers, such as "Amateur" or "Expert," from which the Internet user can choose one or more proficiency modifiers. In FIG. 1F, the Internet user has chosen the proficiency modifier "Amateur." Also as shown in FIG. 1F, the Internet user can choose from one or more temporal modifiers by activating the downward arrow button next to temporal modifier field 110. The Internet user will then be presented with a drop-down menu of temporal modifiers, such as "A month," "Six Months" or "A year," from which the Internet user can choose one or more temporal modifiers. In FIG. 1F, the Internet user has chosen the temporal modifier "A month." Finally, as shown in FIG. 1F, the Internet user can choose one or more geographic modifiers by activating the downward arrow button next to geographic modifier field 112. The Internet user will then be presented with a drop-down menu of geographic modifiers, such as "in the United States" or "Within New York State," from which the Internet user can choose one or more geographic modifiers. In FIG. 1F, the Internet user has decided not to choose a geographic modifier; thus, the geographic modifier field 112 states "None Specified." As will be appreciated by one of ordinary skill in the art, GUI 100 can also be implemented to provide any collection of modifiers in addition to proficiency, temporal or geographic modifiers, including a numeric value or range of values, a price or range of prices, personality traits, type of data, or whether the Internet user wants to receive commercial or non-commercial messages, or identify a particular type of recipient/other party/other transaction type desired to be engaged. GUI 100 can also be implemented to present a choice of modifiers in a checklist format as opposed to a drop-down menu format, or display a choice of modifiers in display area 114 depending from selected nouns.

Once the Internet user has finished creating a statement or set of statements describing the information he wishes to access by selecting a combination of nouns, verbs and modifiers, the Internet user can activate a button labeled "Set and Finish" 116 within display area 114 to save the newly created or modified role. For example, FIG. 1F depicts a "Dog Lover" role for Internet user "Joe" in which he is seeking to find information as an amateur about springer spaniels within the last month, not limited to any geographic area. By activating "Set and Finish" button 116, the Internet user saves the "Dog Lover" role for user name "Joe". If, instead, the Internet user activates a "Set and Continue" button 118, he saves the "Dog Lover" role for user name "Joe," but can then continue to create another role or modify an existing role for user name "Joe." In accordance with the invention, multiple roles can be created.

In this preferred embodiment, a small role data file corresponding to each role is stored, preferably in encrypted form, on the Internet user's PC. Because the role data is encrypted, it can only be read by corresponding decryption software. Well known encryption and decryption software and techniques can be practiced with the invention. Additionally, the role data does not contain any personal identification information about the Internet user, such as the Internet user's name, address, and e-mail address. Rather, in this preferred embodiment the Internet user is assigned an anonymous user identification (ID) number that is stored as part of the Internet user's role data. For reasons described more fully herein, the encryption of the role data and the use of an anonymous ID serves to protect the Internet user's privacy while interacting over the Internet. However, other embodiments of the invention can be practiced in communication systems other than the Internet in which privacy is not a concern (e.g., a corporate intranet). In these other embodiments, role data need not be encrypted and can contain personal identification information about the user.

Figure 2:
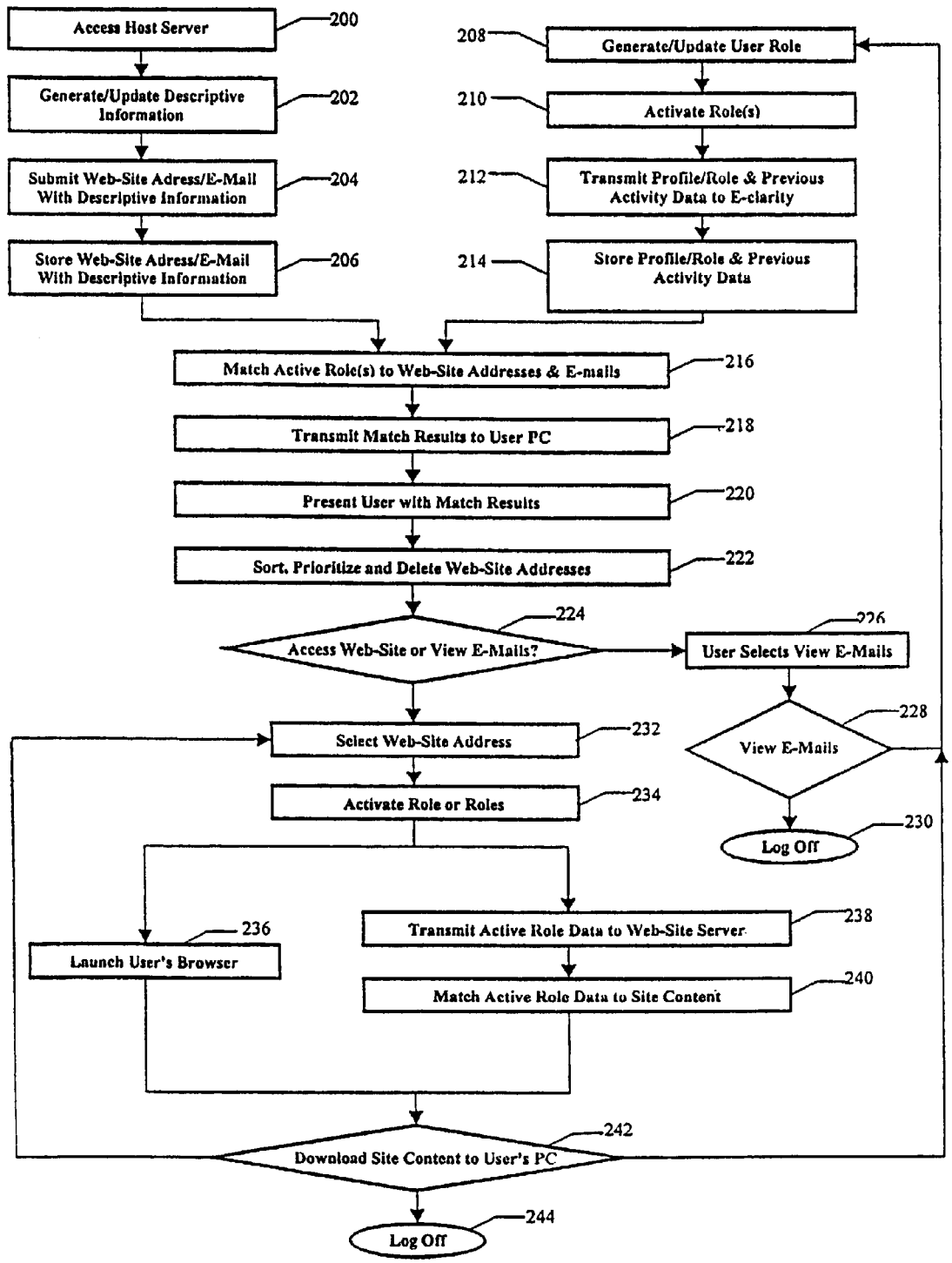
FIG. 2 is a flowchart depicting a method in accordance with the invention.

FIG. 2 depicts a flowchart of a method in accordance with the invention. At step 200, a web-site proprietor, Internet marketer or Internet user accesses a host server over the Internet. At step 202, the web-site proprietor interacts with the host server to generate or update a statement or set of statements about the content of his web-site. At step 202 the Internet marketer or Internet user also interacts with the host server to generate or update a statement or set of statements about the content of a message they wish to send. As discussed above, these statements include nouns, verbs and modifiers selected from the same predefined verbal hierarchy. In this preferred embodiment, the host server presents the web-site proprietor, Internet marketer or Internet user with a GUI of the type described in reference to FIGS. 1A-1F, above, to allow the web-site proprietor, Internet marketer or Internet user to navigate through the predefined verbal hierarchy and generate statements consisting of nouns, verbs and modifiers. As shown in step 204, the web-site proprietor also submits his web-site's address and the Internet marketer or Internet user also submits his message to the host server. At step 206, the host server stores the statements along with their associated web-site address or message.

At step 208, an Internet user generates or updates a statement or set of statements about the information he wishes to access. As discussed above, this statement or set of statements is called a "role" and is comprised of nouns, verbs and modifiers selected by the Internet user from a predefined verbal hierarchy, as well as an anonymous user ID. As also discussed above, the Internet user uses the user's PC and associated GUI described in reference to FIGS. 1A-1F, above, to navigate through the predefined verbal hierarchy and generate statements including nouns, verbs and modifiers. At step 210, the Internet user then activates a role that has been stored as an encrypted file on his PC. At step 212, the Internet user transmits that encrypted role data to the host server. At step 212, the Internet user also transmits to the host server his user "profile," which is the set of all existing role data for the Internet user stored on the Internet user's PC, as well as an encrypted file containing information about the Internet user's activity since the last time the Internet user accessed the host server. This activity information includes those previously-downloaded web-sites addresses the Internet user has chosen to access, the Internet user's ranking or deletion of previously downloaded web-site addresses, or whether the internet user has opted to block further messages from the source of a previously-downloaded message. This activity data can encompass any and all activities taken by users' computers on their behalf during an on-line session. At step 214, the host server stores the Internet user's active role, profile and previous activity data.

At step 216, the host server reads the encrypted role data associated with the currently activated role and compares the statement or set of statements in that role data with the statement or set of statements associated with each stored web-site address and message. In this preferred embodiment, the host server contains decryption software that enables it to decode the encrypted role data. At step 218, if any matches are found the results are transmitted to the Internet user's PC. More specifically, if the statement or set of statements for the currently activated role matches the statement or set of statements associated with any of the stored web-site addresses, then those web-site addresses will be transmitted to the Internet user's PC. Similarly, if the statement or set of statements for the currently activated role matches the statement or set of statements associated with any of the stored messages, then those messages will be transmitted to the Internet user's PC. In the preferred embodiment, the user can designate the extent to which statements must be identical to be considered a match, and this matching criteria can be transmitted to the host server along with the user's role, profile and activity data in step 212.

When the Internet user's PC receives the matching web-site addresses and messages, the Internet user's PC stores the web-site addresses and messages. The matching web-site addresses and messages are stored in files that correspond to the active role that they are associated with. However, the Internet user can define alternative methods for filing the matching web-site addresses and messages on his PC.

At step 220, the Internet user's PC presents the Internet user with an index of web-site addresses corresponding to the currently active role organized by noun, verb and modifier. At step 222, the Internet user can sort and prioritize the web-site addresses. The Internet user can sort and prioritize the web-site addresses according to a variety of criteria, including the Internet user's preference, the exactness of the match between the Internet user's role and the statements associated with the web-site address, or the popularity of the web-site as rated by all users of the inventive system. Information can also be sorted by noun, verb, or other modifier or any nested combination which the User desires. The Internet user can also delete web-site addresses, hide web-site addresses (i.e., remove the web-site address from the index but not delete it), or annotate web-site addresses by typing comments next to the web-site address in the index. In another preferred embodiment of the invention, the Internet user can also flag a web-site address to receive alerts when changes occur related to the web-site corresponding to that address, e.g., to receive an alert when the content of the web-site changes. These alerts can be downloaded from the host server along with the match results in step 218.

At step 224, the Internet user can decide either to access a web-site corresponding to a downloaded web-site address or view downloaded messages corresponding to the currently active role. If the Internet user chooses to view downloaded messages, as shown in step 226, then the Internet user's PC will display the messages to the Internet user at step 228. The messages are displayed organized by noun, verb and modifier. The Internet user can select a specific message or group of messages for viewing and can reply to a message or group of messages. The Internet user can sort and prioritize messages according to a variety of criteria, including the internet user's preference, the exactness of the match between the Internet user's role and the statements associated with the message, the date and time of the message, or whether the message is commercial or non-commercial. The Internet user can also delete messages, hide messages (i.e., remove the message from view but not delete it); or mark messages or groups of messages as read, unread or in need of a reply. While viewing a downloaded message, the Internet user can elect to block any future messages from the source of that message. After viewing his messages, the Internet user can either log off as shown in step 230, return to step 208 create or update a new role, or activate a pre-existing role at step 210 and begin the process over again.

Instead of choosing to view downloaded messages corresponding to the currently active role, the Internet user can also select a web-site address from the index of web-site addresses by clicking on an address at step 232. As shown at step 234, when the Internet user selects a web-site address, the Internet user is then permitted to activate any one of his pre-existing roles or any combination of his pre-existing roles, which will then in effect define the Internet user's persona when interacting on the Internet. If the Internet user does not choose a role or combination of roles, then his default role will be the role used to download the web-site address. The Internet user's PC then launches the user's Internet browser to access the web-site addressed by the selected web-site address, as shown in step 236.

At approximately the same time, as shown at step 238, the Internet user's PC will also transmit the data file or files associated with the currently activated role or roles to the web-site's server as well as the role that was used to download the web-site address. When the web-site's server receives the encrypted role data, it reads the role data using decryption software and then matches web-site content to the statement or set of statements contained in that role data, as shown at step 240. Custom content is then downloaded to the Internet user's PC at step 242. In this way, the invention allows the web site's server to present custom content to the Internet user without having to track the Internet user's activity in a manner that can invade the Internet user's privacy. The Internet user's privacy is also protected because the role data is encrypted and does not contain any personal identification information about the Internet user.

At this point, the Internet user can either log off as shown in step 244, choose another web-site address from the index of web-site addresses at step 232, return to step 208 and create or update a new role, or activate an existing role at step 210 and begin the process over again.

As will be appreciated by one of ordinary skill in the art, the above-described method can be used to send and receive information other than web-site addresses and messages. For example, the above-described method can be used to send and receive electronic coupons (e-coupons). In one such embodiment, an e-coupon provider provides a host server with an electronic coupon and a statement or set of statements describing the electronic coupons he wishes to distribute according to a predefined verbal hierarchy of nouns verbs and modifiers. The Internet user defines a role according to the same predefined hierarchy in which the Internet user specifies whether or not he wishes to receive e-coupons related to his role and provides that role to the host server. The host server then provides the e-coupon to the Internet user if the Internet user has specified that he wishes to receives e-coupons related to his role and his role matches the statement or set of statements describing the electronic coupon.

In another preferred embodiment, the above-described method is used to send and receive schedule information for real-time scheduled broadcasts or events, such as television or radio broadcasts, web-casts, chat room events, sporting events, lectures, plays, concerts or classes. The Internet user defines a role in which he specifies a broadcast or event lie would like information about by specifying certain criteria, including the broadcast medium, the participants (e.g., actor, director, performer, team, etc.), the subject matter, location, time and date. The host server then provides the scheduling information to the Internet user if the information about the broadcast or event matches the criteria in the Internet user's role.

In another preferred embodiment, the method described above is used to send and receive a list of currently active Internet chat rooms to an Internet user. In one such embodiment, the host server maintains a list of links to currently active chat rooms covering certain subject matter areas. The Internet user defines a role according to the predefined verbal hierarchy in which the Internet user specifies whether or not he would like to receive a list of currently active Internet chat rooms related to his role and provides that role to the host server. The host server then provides the Internet user with a link to any currently active chat room that concerns subject matter related to the Internet user's role. The Internet user may then participate in the currently active chat room by selecting a link. The Internet user may also start his own chat room corresponding to his role and post a link to that chat room on the host server for distribution to other Internet users.

In another preferred embodiment, the user's role information can be used to help community lists, newsgroups, user groups, forums, and other community building functions, both on-line and off-line, which match the statements within the User's role information.

Figure 3:
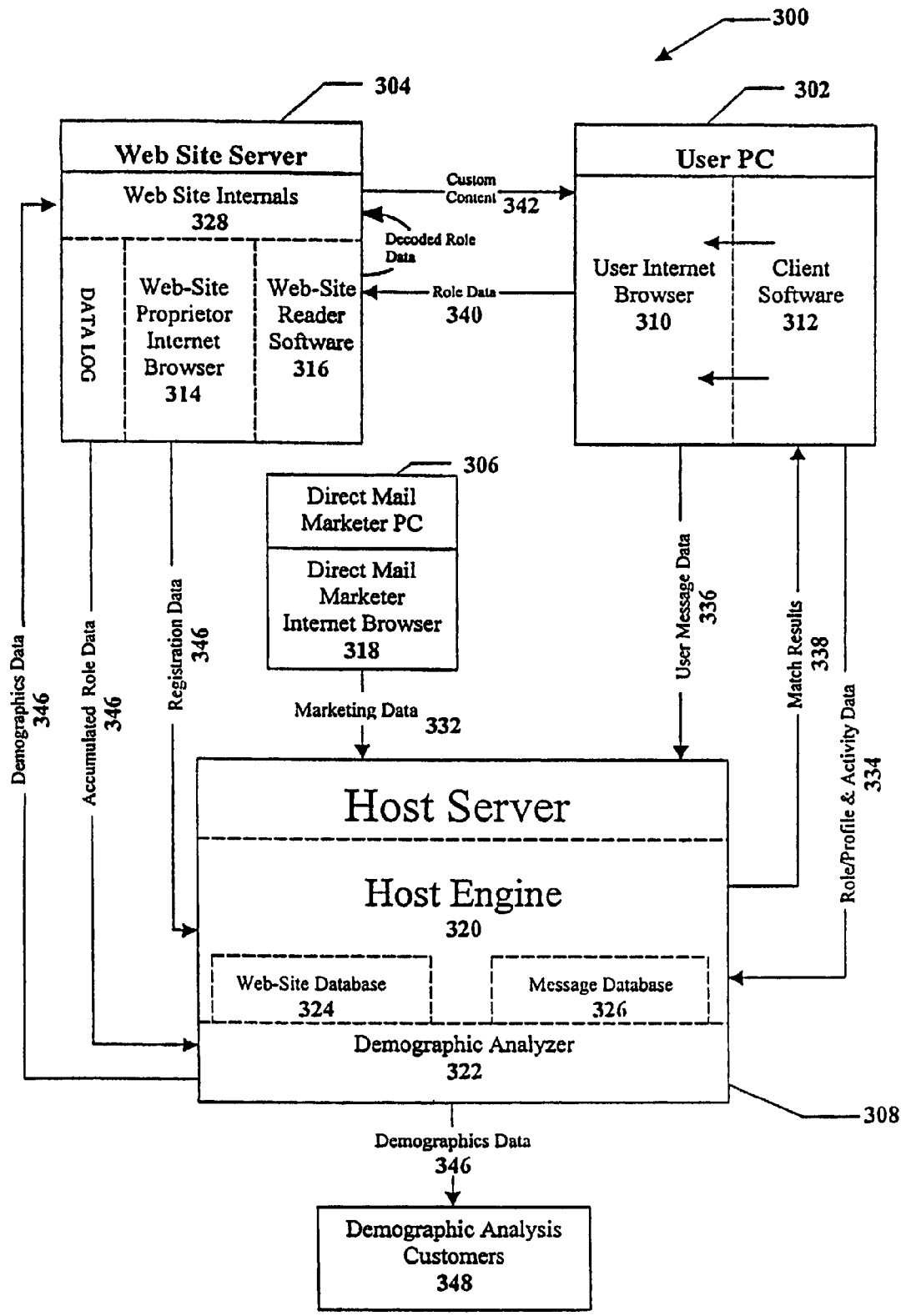
FIG. 3 is a block diagram showing a verbal classification system in accordance with the invention.

FIG. 3 is a block diagram that depicts a system 300 according to a preferred embodiment of the invention. System 300 includes a user personal computer (PC) 302, a web-site server 304, an Internet marketer PC 306, and a host server 308. User PC 302 can communicate with web-site server 304 and can transmit and receive information to and from web-site server 304. User PC 302 can also engage in communication with host server 308 and can transmit and receive information to and from host server 308. Web-site server 304 can also communicate with host server 308 and can transmit and receive information to and from host server 308. Internet marketer PC 306 is for communicating with host server 308 and can transmit and receive information to and from host server 308. In this preferred embodiment, all communications are transmitted electronically over the Internet using hard-wired connections with well-known interfaces and protocols as will be appreciated by one of ordinary skill in the art. In addition, the invention can be practiced with a plurality of user PCs 302, web-site servers 304, Internet marketer PCs 306, and host servers 308.

In this preferred embodiment, system 300 also includes several software components to facilitate the features of the invention. With further regard to FIG. 3, user Internet browser 310 and client software 312 reside on user PC 302. Client software 312, in part, provides the role generation and update features discussed above. Web-site proprietor Internet browser 314 and web-site reader software 316 reside on web-site server 304. Internet marketer Internet browser 318 resides on Internet marketer PC 306. Host engine 320 and demographics analyzer 322 reside on database server 308. Each of these software components are comprised of commercially available computer programs which are compatible with commercially available hardware (e.g., Intel-based computers and servers) and operating systems (e.g., Windows, Unix, and MAC). In this preferred embodiment, client software 312 is downloaded from host server 308 for installation on user PC 302, and web-site reader software 316 is downloaded from host server 308 for installation on web-site server 304.

As shown in FIG. 3, host server 308 also stores web-site database 324 and message database 326. Databases 324 and 326 are object-oriented databases for storing information according to a predefined verbal hierarchy of nouns, verbs and modifiers. In this preferred embodiment, client software 312 also contains an object-oriented database for storing information according to the same predefined verbal hierarchy of nouns, verbs and modifiers. In another preferred embodiment, client software 312 resides on host server 308 and is accessible to an Internet user via the Internet. Although in this preferred embodiment databases 324 and 326 and the database in client software 312 are object-oriented databases, these databases can be implemented with various types of databases known in the art, including relational databases, flat-file databases, or inverted-list databases.

A web-site proprietor uses web-site Internet browser 314 resident on web-site server 304 to interact with host server 308 to generate or update a statement or set of statements about the content of his web-site. As discussed above, this statement or set of statements includes nouns, verbs and modifiers selected from the same predefined verbal hierarchy. In another preferred embodiment, web-site Internet browser resides on a PC separate from web-site server 304 which can be used by the web-site proprietor to interact with host server and generate or update a statement or set of statements about the content of his web-site. The web-site proprietor then transmits this descriptive data along with the address of his web-site to host server 308 as registration data 330. In operation, when host server 308 receives registration data 330, host engine 320 stores registration data 330 in web-site database 324.

An Internet marketer uses Internet marketer Internet browser 318 resident on Internet marketer PC 306 to interact with host server 308 to generate or update a statement or set of statements about the content of a message he wishes to send. As discussed above, this statement or set of statements includes nouns, verbs and modifiers selected from the same predefined verbal hierarchy. The Internet marketer then transmits this statement or set of statements along with his message to host server 308 as marketing data 332. In operation, when host server 308 receives marketing data 332, host engine 320 stores marketing data 332 in message database 326.

An Internet user can use user Internet browser 310 resident on user PC 302 to interact with host server 308 to generate or update a statement or set of statements about the content of a message he wishes to send. As discussed above, this statement or set of statements includes nouns, verbs and modifiers selected from the same predefined verbal hierarchy. The Internet user then transmits this statement or set of statements along with his message to host server 308 as user message data 336. In operation, when host server 308 receives user message data 336, host engine 320 stores user message data 336 in message database 326.

In other preferred embodiments of the present invention, information other than web-site addresses and messages can be sent to host server 308 by web-site proprietors, Internet marketers, Internet users and others. This information includes but is not limited to electronic coupons, streaming audio and video, public service announcements, match results from newsgroups or private bulletin boards, and scheduling information regarding on-line forums and chat sessions, broadcast media programming, or community events.

An internet user uses client software 312 resident on user PC 302 to generate or update a role as described in reference to FIGS. 1A-1E above. The Internet user then uses client software 312 to transmit encrypted role/profile and activity data 334 to host server 308. Role/profile and activity data 334 is comprised of the Internet user's currently activated role, the Internet user's profile, which is the set of all existing role data for an Internet user stored on user PC 302, and any previous activity information concerning web-site addresses or e-mail messages previously downloaded from the host server corresponding to the currently active role. In operation, when host server 308 receives role/profile and activity data 334, host engine 320 reads that data using decryption software and sends a copy of it to demographics analyzer 322.

When host server 308 receives role/profile and activity data 334, host engine 320 also matches the Internet user's currently active role data with registration data 330 stored in web-site database 324 by comparing the statement or set of statements in the Internet user's role data with the statement or set of statements in registration data 330. If the statements match, then host engine 320 transmits the web-site addresses in registration data 330 to user PC 302 as part of match results 338. Similarly, when host server 308 receives role/profile and activity data 334, host engine 320 matches the Internet user's currently active role data with marketing data 332 stored in message database 326 by comparing the statement or set of statements in the Internet user's role data with the statement or set of statements in marketing data 332. If the statements match, then host engine 320 transmits the messages in marketing data 332 to user PC 302 as part of match results 338. Finally, when host server 308 receives role/profile and activity data 334, host engine 320 matches the Internet user's currently active role data with user message data 336 stored in message database 326 by comparing the statement or set of statements in the Internet user's role data with the statement or set of statements in user message data 336. If the statements match, then host engine 320 transmits the messages in user message data 336 to user PC 302 as part of match results 338.

After user PC 302 has received match results 338, client software 312 stores the match results. In this preferred embodiment, the match results are stored in a database in client software 312. In another preferred embodiment, the match results are not stored on user PC 302 at all, but instead are stored on a database on host server 308 and accessed remotely by the Internet user.

The Internet user can use client software 312 to read the content of the messages in match results 338. Because the Internet user has been provided with only those messages that correspond to the Internet user's interests, as defined in the Internet user's role, the invention permits the Internet user to avoid "spam" messages and other communications outside those interests. The invention thus also permits the Internet marketer to efficiently reach an audience that is interested in its marketing information without resorting to "spam" messages.

The Internet user can also use client software 312 in conjunction with user Internet browser 310 to access web-sites corresponding to the web-site addresses in match results 338. For example, as shown in FIG. 3, the Internet user uses client software 312 to launch user Internet browser 310 and access web-site server 304 addressed by a web-site address in web-site match results 338. When client software 312 accesses web-site server 304 via user Internet browser 310, it also transmits encrypted role data 340 to web-site server 304. Role data 340 includes one or more roles chosen by the Internet user that will define the Internet user's persona when interacting with web-site server 304 and includes the role that was used by the Internet user to obtain the web-site address for web-site server 304 from host server 308.

Web-site server 304 contains web-site internals 328, which includes a web-site engine and web-site content. In operation, when web-site server 304 receives role data 340 from user PC 302, web-site reader software 316 reads role data 340 using decryption routines and passes it to the web-site engine, which then matches custom web-site content to the statement or set of statements in role data 340. In this preferred embodiment, custom web-site content is then transmitted to user PC 304 as custom content 342. The invention thus permits web site server 304 to present custom content to the Internet user without having to track the Internet user's activity in a manner that may invade the Internet user's privacy. The Internet user's privacy is also protected because role data 340 is encrypted and does not contain any personal identification information about the Internet user, but instead contains an anonymous user ID number associated with client software 312.

After user PC receives custom content 342, the internet user can further interact with web-site server 304 via client software 312 and user Internet browser 310.

When web-site server 304 receives role data 340 from user PC 302, reader software 316 stores that role data in a data log on web-site server 304. Accumulated role data 344 is then transmitted to demographics analyzer 322 on host server 308. Demographics analyzer 322 uses accumulated role data 344, registration data 330 stored in web-site database 324 and role/profile and activity data 334 to calculate demographics data 346. Demographics data 346 can include accumulated information about Internet users, web-sites, as well as a comparison of Internet users' interests to the web-sites they visit.

Because demographics analyzer 322 has collected role/profile & activity data 334 from a variety of Internet users over time, demographics analyzer 322 can make individual distinctions about Internet users. For example, demographics analyzer 322 can analyze the total set of nouns, verbs and modifiers in the statement or set of statements of an Internet user's profile to determine an Internet user's affinity towards a particular subject matter area further defined by what types of actions they wish to perform in relation to those subject matter areas and again limited by the modifiers they select. Because an Internet user's profile and role data can change each time the Internet user accesses host server 308, demographics analyzer 322 can also track an Internet user's changing interests over time. For example, demographics analyzer 322 can track how a group of Internet users' demands change over time in order to forecast supply issues. Demographics analyzer 322 can also determine how many separate roles correspond to a single Internet user and how often the Internet user accesses the Internet in any given role as opposed to the Internet user's other roles. Demographics analyzer 322 can also use the Internet user's activity data to determine where and when an Internet user has interacted using a particular role or roles. A benefit of the invention is that demographics analyzer 322 does not need to track an Internet user's activity on the Internet to perform this analysis Because demographics analyzer 322 also collects accumulated role data 334 from web-site server 304, demographics analyzer 322 can derive useful information about web-site server 304. For example, demographics analyzer 322 can determine the active role or roles of every Internet user who accessed web-site server 304, and which nouns, verbs or modifiers led Internet users to access web-site server 304. Demographics analyzer 322 can calculate the distribution of Internet users visiting web-site server 304 according to the nouns, verbs and modifiers in each Internet user's role data. Thus, demographics analyzer 322 can determine what subject matter areas and activities Internet users who visit web-site server 304 are most interested in at the time they visit.

Demographics analyzer 322 can also use registration data 330 stored in web-site database 324 to provide market research analysis by determining what types of products and services are available on the Internet. Demographics analyzer 322 can also use registration data 330 to perform trend analysis regarding the expansion or contraction of web-based business activity. Demographics analyzer 322 can also use information from many participating web-servers to aggregate information which relates to a particular subject or industry area in aggregate across the web. Also, demographics analyzer 322 can be used to analyze information from this system and correlate it to other systems, like the CPI (Consumer Price Index), inflation, certain stocks, or any other trackable variable). The demographics analyzer can analyze, in a multiplicity of ways, the user's self-reported information against the activity information against the behaviorally collected information, against the site/Internet information, and linked to any other outside information believed to correlate to any of these system-derived information sources.

Demographics data 346 can be transmitted to web-site server 304 or communicated to demographics analysis customers 348.

A host administers the system described above with reference to FIG. 3. The host provides and maintains host server 308, including host engine 320, demographics analyzer 322, web-site database 324 and message database 326. The host also provides an on-line interface on host server 308 which a web-site proprietor can use to generate and provide registration data 330, an Internet marketer can use to generate and provide marketing data 332, and an Internet user can use to generate and provide user message data 336. The online interface receives and processes a payment from an Internet marketer in exchange for posting the message in marketing data 332. The on-line interface can receive and process a different fee for various types of messages, e.g., commercial, non-commercial, or non-profit. In another embodiment of the present invention, the online interface receives and processes a payment for posting other types of information, such as e-coupons and schedule information for real-time scheduled broadcasts or events.

The host can allow advertisers to sponsor the download to the Internet user of web-site addresses and messages. More specifically, in exchange for a fee, the host can post an advertisement in a dialog box that appears on user PC 302 at the time the Internet user is downloading match results 338 from host server 308. The host can present advertisements with subject matter that is related to the Internet user's active role so that the advertiser may more efficiently reach an audience interested in his product or services and so that the Internet user receives advertisements targeted at the Internet user's stated areas of interest.

The host can also allow advertisers to sponsor parts of the predefined verbal hierarchy. In exchange for a fee, the host can place an advertisement in the background of the GUI that web-site proprietors, Internet marketers and Internet users use to generate or update a statement or set of statements about their web-site or message and that the Internet user uses to generate a role. The host can present advertisements with subject matter that is related to the portion of the predefined verbal hierarchy in which the web-site proprietor, Internet marketer or Internet user is currently navigating, so that the advertiser may more efficiently reach a target audience interested in his product or services and so that the Internet user receives advertisements targeted at the Internet users stated areas of interest.

In this preferred embodiment, the host checks whether or not the statement or set of statements in registration data 330 accurately reflects the web-site that it describes, and rejects registration data 330 if it does not. The host also checks whether or not the statement or set of statements in marketing data 332 accurately reflects the message that it describes, and rejects marketing data 332 if it does not. Similarly, the host checks the statement or set of statements in user message data 336 to see if it accurately reflects the message that it describes, and rejects user message data 336 if it does not.

The host provides an on-line interface on host server 308 that a web-site proprietor can use to purchase and download web-site reader software 316. The host also provides an on-line interface on host server 308 that Internet users use to download client software 312. In other preferred embodiments, the host provides for the distribution of web-site reader software 316 and client software 312 through the mail or through retail stores.

In another preferred embodiment, the host provides an on-line interface on host server 308 that an Internet user, web-site proprietor or Internet marketer can use to identify new nouns, verbs or modifiers that they would like to see added to the predefined verbal hierarchy. The host is capable of modifying the predefined verbal hierarchy to include these new nouns, verbs or modifiers.

The host provides an on-line interface on host server 308 that web-site proprietors and demographics analysis customers 348 can use to purchase demographics data produced by demographics analyzer 322. The host can organize this data into standard reports, such as standard reports regarding user profiles and activity or web-site registration data, newsletters, or generate ad hoc reports tailored to the needs of a web-site proprietor or demographics analysis customer 348. To this end, the on-line interface on host server 308 permits web-site proprietors and demographics analysis customers 348 to define the informational content of the reports they want to receive. Reported demographics data may be based on Internet users' profile information or individual role information, on total activity across all web-sites or to a specific web-site. In this preferred embodiment, demographics data 346 can be downloaded by web-site proprietors or demographics analysis customers 348 over the Internet.

As would be apparent to one skilled in the art, the teachings of the invention are applicable in many different applications. For example, the invention can be used with a stand-alone database wherein items of information are classified and stored according to a statement or set of statements selected from the same predefined verbal hierarchy of nouns, verbs and modifiers. In this embodiment, each item of information and associated statement or statements is stored and accessed as a unique object.

Practical Applications

The role of a pseudonym and password as the only identifying data in a privacy model "best case".

1) The invention provides a single ID# which is not tied to the name, address, SS# or any other personally identifying information in the "real world" about an individual, and can be used as the unifying "Record ID" to characterize that a set of information aggregated about an "electronic individual" actually belongs to a single anonymous entity.
2) Given the above information a Corporation can set up a single ID# which is then the "identity" for that corporation, and can have different "user id's" defined inside which relate to the users inside the "corporate entity".
3) Identities and Roles are related in that a "set" or "identity" can consist of subsets or "roles".

The breaking of an "individual" into multiple "roles" on a consumer or user side reflects the building of different personality aspects or activity zone-related segments that can be activated and deactivated at will, so as to more closely represent the psychological aspect or functional needs of the User at that time.

4) Users can create multiple roles which are aggregated into one personality profile of themselves based on a single ID# or key.
5) Businesses can create multiple roles within their corporate identity in same fashion when using the system, i.e.,
   a. Purchasing department (Role of Smith Inc.) has 3 subroles for each of the purchasing agents.
6) On the supply side of the equation (the Internet "advertiser" or site side) a company can identify that its data belongs to a particular "aspect" or "functional role" (i.e., that a particular piece of content or ad is part of its customer service department's collateral) In this way, companies can be segmented in their ad campaigns, personalization information, and historical data analysis, in the same or similar fashion as an internet user can be.
7) Data analysis can be performed on data as segmented into roles, by subject criteria, or any other variable.

How the data for statements is gathered:

1) it can be gathered through a GUI as in the diagram, or dragged and dropped as words into a "diagram" of a sentence type fashion,
2) it can be gathered through a speech or A/I system in the following fashion
   a. "What's the subject, User?" A: "Wine" Q: What would you like to do with wine: Here are some options, buy, sell, drink, etc. Please choose one"

How the Language Based Protocol (LBP) is Useful:

1) The LBP combined with the segmentation of people (or a company on the supply side into departments, or subsections or lines of business) forms a data architecture which is highly detailed. Example: Data which matches the following verbage "buy wine in CA" AND matches my Wine Lover Profile . . . is stored "here".
2) In industries such as entertainment, the LBP structure (verbal classification system and personality/role/identity mapping system) combined with the "other indexes" this information can be hooked to inform selections like: Author, director, genre, performer, actor, year, award, etc. references, to create search, storage and retrieval indexes on entertainment choices. The analysis of information against this subject matter can provide information regarding popularity, behavior and choices of intention in entertainment, or the relationship between stated intention, behavior and the LBP framework or other variables correlated to it.
3) The LBP can also specify "content type" (i.e., streaming audio, visual, etc.) and can filter based on:
   a. Content type
   b. Date
   c. Units of measure
   d. Price
   e. UPC code
   f. Who is the "owner" or "originator" of that information or transaction is, i.e., that only information originating from a specified source described in similar LBP statement fashion, or described by any outside variable (such as license, certification, permit to transact legally, etc.) should be interacted with.

g. Any other variable, such as catalogue number, etc.

What Can be Done with the "Statements" Collected Inside a Role, etc.

1) Statements of preferences can be made about which variables to sort or in simple or complex sorting procedures (sort by Wine, then by "Verb" then by "where")
2) Statements can be leveled in priority, and/or make operational in a group: (i.e., an instruction set: for example:
   a. First, "buy wine in California"
   b. Second "show information about travel in California" OR
   A: First, "buy wine in California" time limit: Today
   B: Second, sell as reseller Napa Valley Chardonnay, Quantity Limit, 15 bottles, Time Limit, Today, Other Transacting Party Limit: Over Age 21, authorized by XYZ, Geographic Limit California only.
3) Statements can be associated with a variable like % or a range, or a time limit. e.g., "buy wine in California" with a range of price between 3 and 5 per unit.

A "role" can be a segmentator that could create different roles based on delivery devices, parts of a person's personality, their mood, or any other factor that can be segmented by using the language system. A role could be the living room of one's home, a time of day, a mood, an activity or hobby, etc. or anything else that is simply the result of what the statements and related preferences identified and grouped into a set called a Role call out expressly.

NOTE: This is a significant feature because what the invention can do with this is not only "tell" the supply side WHAT to show to the "user" but:

1) in what order
2) which are top priorities
3) what content type
4) when
5) how to display it—content type, audio, visual, style, etc.
6) if then type statements can be constructed using the language to create executable instructions for computers.
7) What necessary criteria must be tested against (other party requirements included) in order to complete a transaction.

With this capability, another benefit is that a User can "tell" a site, based on preferences stored under that "role" or the sentences inside the role, that in order to reach a "decision" in this "session", (or a buying decision for example), that the following criteria, in a particular order have to be met (like a case statement in basic), in order to proceed with a transaction: i.e., checking out a car on the net:

1) show me information about safety
2) I'd like to HEAR testimonials about customer satisfaction
3) I'd like to compare prices
4) Check delivery
5) Reliability is the next most important factor, or warranty, etc.

This, in effect, allows the user to "write" macros or subroutines for a generic "scripting language" that any software product capable of translating can decode and act upon. Therefore, custom presentations can be created for each individual person, getting the subject right, the "look and feel" right, the sequence of events/criteria right, and after the event, using the customer-supplied criteria and weighting to analyze the event, both individually and in aggregate.

It will be appreciated by those having skill in the art that the Language Based Protocol described herein can be used as a uniform "scripting language" to enable a human being to perform any task on their behalf using a computer system which can translate the "scripting language" and act upon it. It will also be appreciated that these instructions can be housed anywhere within the computer system, and can operate independently as agents for the author of them. For instance, instructions could be set or stored inside the profile of one's bank account, one's home wiring system, one's car, one's office, computer, cellphone, etc.

Also, because the "roles" can be characterized with icons, or placeholders which have a look or feel visually, auditorially, or in some other sensorial way, this information can feed back into the analysis of what the User preferences are in data analysis.

For Example:

Sara has a "gourmet food" role and uses a "country gingham style icon or picture to symbolize that on her PC. The invention thus "knows" that her "taste" in the subjects contained within that role have a "country gingham" look and feel, because Sara could choose from different styles.

What Types of Activities the Invention can Support:

Buying and Selling anonymously through the inventive system, if connected to a Secure Trusted Source (i.e., credit card verification), and connected with fulfillment chain.

1) The invention in a B2C internet environment can track user behavior because it is capable of being implemented for proxying user traffic or uploading historical information about user behavior, but does not violate user privacy because it does not keep records of ISP logins, name, SS#, etc. at the administrative level and history records. When a Consumer goes to a shopping site and fills up a shopping cart, the invention can then pass Consumer to a trusted Secure Source for Credit Card Authorization, and then return with Consumer's authorization, but without having gathered User's name.
2) In partnership with the "trusted electronic funds source" (i.e., a credit card) or other neutral third party, the invention can give Business an ID# that says that "Anonymous person paying with Credit Card" purchased this item in your catalogue, on this date, and the Serial # is 1234, etc. This information is held in "escrow" for warranty, etc. purposes where identity is legally necessary.
   a. Should Users need to exchange or complete warranty transaction, they simply notify "Credit Card" that they hold an authenticated "certificate" entitling them to "open" the escrow for that purchased item, and then at that point, the Consumer is put in contact with the manufacturer or warranty provider.
   b. Discounts for frequent purchases, etc. could be maintained in this third-party escrow account, and the User>Credit Authenticator>Merchant ".file" could be anonymous yet contain all the necessary information to process customer requests by this "infomediary" system.
   c. Fulfillment can be tied to the back end of the process as a step in the process chain, where another "trusted source" receives information to ship product to a specified location.
3) Information contained within Roles or whole User Profile can be sent anonymously as a "wish list" of desired products to different people who might want to know what User would like as a gift.

4) Age verification or other Authentication tied to the anonymous Identity.
   a. Working with a third party certifier, or authenticator (like verisign, or a credit card company, etc.) the invention can determine to "Internet standards" whether a person is "authentic" to conduct a transaction (use a credit card, has sufficient funds, etc, watch adult content on the net, etc.). The invention can then take an authentication key from that third party source and verify that the setting up of an account for an anonymous individual should be done for them as:
      a. An adult
      b. A citizen
      c. Capable of doing a financial transaction
      d. Other qualifying factor, such as driver's license #, thumbprint, etc, licensed or legally able to conduct a particular transaction.
   This information can then be used to:
      allow this person access to content and types of actions possible within the system.
      Conduct testing by a third party source, and store testing information associated with the profile information, or other system information, as part of the verification-based transaction system Chatting, Communities, and Sending and Receiving "Anonymous" Emails, Announcements, etc.

A User and/or Business can request to "send" messaging to other members of the invention system's population. "Sending" really entails specifying in the LBP language that a particular group is intended to receive this type of content.

Users can "block" other anonymous people who have authored "sent" information by identifying a piece of content and saying "delete" or "block author" using GUI tools.

Users can also set "permit direct conversation" which means that on-line chat-type permission levels could be granted to another system anonymous individual, or "blocked" as the User wished.

Feedback Loop on "Filtered Out" or "Deleted" Sites, "Entities" or "Content"

When a User determines that they wish to block a site from the "sites list" or a piece of content's author from future communications, the invention can be configured to invite that User to immediately get in touch with that entity and let them know why. This is a powerful customer relationship management feedback loop for businesses. The invention can thus provide "real time" feedback to businesses about:
1) What types of individuals (based on the demographic profile of that individual) are tuning them out;
2) Qualitative information about why—the invention can offer direct access to a company's 800 number, on-line "chat" or "email to that company" while the person is making the decision to "filter them out".

Sweepstakes Anonymously

A User can be entered into a subject category "sweepstakes" on the subject area of the system "Map" each time they visit a particular subject area, or meet some other defined criteria selected by the sponsoring business holding the sweepstakes. An anonymous "ticket" is recorded to that "anonymous individual". If that ticket is selected, a notification appears to that individual that they've won the sweepstakes, and that authenticated email has a verification code and authorization process to validate that the message is going to the right individual.

Sweepstakes "extra chances" can be tied to business agendas of:
1) performing a behavior that sponsoring business requests voluntarily—i.e., watching an infomercial through the messaging layer and answering a survey
2) participating in an "on-line focus group"

Coupons, Promotions, that "remind you" that they need to be spent at a vendor's site.

How the Language Looks, Sounds, etc.

Because the Language Based Protocol is able to be displayed or presented to the User or Business in visual "type" or "sounds" or "pictures" or any other symbolic set, children, adults, etc. can determine which "symbol dictionary" they wish to use, and these can be cross-referenced to each other.

Example: A child can use pictures, navigate the subject map and drag and drop them together. The symbol that looks like a "house" would be cross referenced to:
1) house (English)
2) casa (Spanish)

Because the system stores "house" and "casa" and "symbol for house" as OBJECTS in it's object dictionary, it doesn't matter which "word" was selected by which language group to make the transaction happen.

Automated systems of any kind can be made to interact with the classification including transaction processing, marketplaces, recall or alert systems, biomedical applications.

Transaction processing—an amount of $ can be identified as associated with a statement, and transactable when the appropriate conditions within the statement are met.

Marketplaces—physical goods and the rules for their exchange can be implemented with Statements. In addition, manufacturing resource planning, commodities trading, etc. could be linked to the information gathered within the demographics system. As an example, projected anticipated buying self-reports (buy wine in California in 2 months), could inform planning, manufacturing and resource behaviors. Trends analysis, etc. could be conducted based on this information and its correlation to things such as the CPI, GNP, etc.

Recall or alert systems—Profiles or ownership of consumer goods, Profession, prescription drug profile, physical fitness, personality, or other characteristics could be created, wherein a person could be notified through the inventive messaging system if they fit a particular profile pattern—i.e., taking a combination of medicines which were now known to be high risk in combination, a manufacturer or supplier could issue an alert to that population that their profile, if accurate, might put them in a risk population. Not only would this recall/alert information based on profile allow for notification of individuals, it could also be used in research as indicated within the characteristics of the Demographics Analysis system. For instance, information could be gathered that individuals who state themselves to be very physically active do not take combination XYZ of health remedies as often as members of a demographic group with a less physically active self-reported profile.

Another example would be the ability to state a professional profile, and the ability to be contacted with alerts regarding legislation, new products, employment offers, etc. relative to that profile. Analysis of this information as well would be useful.

Biomedical applications—for instance, a person can wear a device which stores and records via speech recognition the statements which a person describes about their daily actions, moods, etc. and the times of day. This data can be compared with data collected via biomedical equipment—heartrate, blood chemistry, respiration, Galvanic Skin Response, etc.

for later analysis. It can also be combined with or used in conjunction with devices which could be considered drug or treatment delivery devices—i.e., electronic stimulation devices, controlled delivery/release devices for drugs, etc. where these devices could use information from the person and outside conditions (day time etc.) to affect dosages, treatment, etc. decisions and conditions.

Clinical trial groups where a device which can record a person's mood, activities, etc. as self-described using the system's language, while being monitored for body chemistry, drug levels, etc.

Drug delivery, electronic stimulation devices, or other delivery treatment or monitoring systems that can be connected to or informed by a device which captures the Individual's self-reported statements (i.e., I feel 75% pain free) via the LBP verbal structure, which can be made about what the individual thinks, feels, or believes is happening objectively around them (i.e., it's a hot and humid day) or (I am now being exposed to an allergen) and may or may not be able to monitor outside circumstances (i.e., weather barometrics, temperature) and monitor internal information of that person (heart rate, pulse, Galvanic Skin response, blood chemistry, EEG of other physically measurable state), and use the combination of this information to make decisions (in real time or on a periodic basis) about dosage of mediation, level of stimulation needed etc. In this regard, a person's self-report would be "digitally collected" by the inventive system and used as a component in research and treatment.

Speech-Control and Computer Input Control of Automated or Robotic Systems

Use of the LBP language structure and Role-based segmentation could be implemented to control external conditions in buildings, or to animate robotic systems. Two such instances would be the ability to program the condition and state of one's home or office or automobile via the language system ("Temperature Increase 4:00 PM until 6:00 PM to 72 degrees, Kitchen only") and the ability of systems to respond to the desires of people who were unable to use other controls (i.e., Milk Bring Bed Now) such as the infirm, elderly, paralyzed, etc.

Networking, Disk Storage Systems, Resource Allocation, Other Applications

Networking hardware could read statements and route data based on the data tags. Disk storage cross referenced indexes for legacy data and data architectures for new data using the system's format. Computer and other resources could be automatically allocated to a person based on their Role, a statement, or their entire profile. Optimization, storage, presentation, schemes could be constructed which were informed by the information contained in the Role, statement or behavioral data, or outside factors (time of day, geographic region) or any combination of these. Data access permissions and check-offs or authentication could be tied to identities, Roles, or subject area statements within a particular role (e.g., a particular subject area of data could be identified as accessible only to individuals with a particular role characteristic (VP of marketing) or permission level/ID, etc.).

Although the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A method of communication comprising the steps of:
   creating a multi-part catalogue of words in a human language organized into categories based on:
   sorting words into groups based on the parts of speech to which the words belong; and
   arranging each group of words in a hierarchical system of class/subclass, set/subset or parent/child object relationship structure, from most general to most specific, wherein members of any subclass/subset in the hierarchy inherently have the same general characteristics as the parent/class word object, but are more specialized versions of the parent class to which they belong;
   giving each word meaning a unique reference value which identifies it as a unique object within the catalogue of words and said reference value denoting the unique place the word occupies in an organizational system, which category of words it belongs to, and its position within the group category's hierarchy of class/subclass;
   offering said word catalogue to a user, who selects one at a time word choices from the catalogue in a fixed choice protocol based upon whether they are nouns, verbs or modifiers; and
   allowing the user to link the word choices together to form a meaningful language statement, for the purpose of expressing an intention; and
   offering said system of meaningful language statement creation to multiple individuals in order to create a uniform communication tool and communication platform between multiple parties;
   transferring said meaningful language statements between two parties for a designed interaction between them;
   forming each said meaningful language statement as a preference characteristic of a user who is one of said two parties; and
   giving each said preference characteristic a descriptive name relating to an aspect of said preference characteristic.

2. The method of communication recited in claim 1 further comprising the step of assigning to a meaningful language statement creator, an anonymous user identification index which is not associated with any other form of user identifying information.

3. The method of communication recited in claim 1 further comprising the steps of:
   each user creating profile preferences formed from said categories of words according to said language based protocol;
   each user requesting information from the Internet using their respective user interface according to said language based protocol; and
   analyzing said request of information based upon said user profile preferences and arranged data repositories of said content providers.

4. The method of communication recited in claim 1 further comprising the step of:
   using said meaningful language statements to form an indexing architecture for labeling, filing, storing, retrieving and sharing items.

5. The method of communication recited in claim 1 further comprising the step of:
   using said meaningful language statements to form the instruction set of a computer programming language.

6. The method of communication recited in claim 1 further comprising the steps of:
   associating said meaningful language statement to data content;

providing each user with the same user interface for arranging words in categories;

allowing each user to create profile preferences formed from said language statements;

using said language statements to retrieve, transact, or otherwise interact with said data repositories;

analyzing said request of information based upon said user profile preferences and arranged data repositories of said content providers.

7. A method of communication comprising the steps of:

creating a multi-part catalogue of words in a human language so that the catalogue includes categories for various parts of speech, including action words, object words and modifier words which are used to modify actions and modifier words which are used to modify objects;

said catalogue consisting of a variety of word choices in every category of said parts of speech;

organizing said catalogue of words according to the following criteria:

creating separate groups for action words, object words, modifiers of action words and modifiers of object words; and sorting the words of a language into groups based on the parts of speech to which the words belong;

within each separate group, arranging the words in a hierarchical system of class/subclass, set/subset or parent/child object relationship structure, from most general to most specific, wherein members of any subclass/subset in the hierarchy inherently have the same general characteristics as the parent/class word object, but are more specialized versions of the base class or parent class to which they belong;

where a word can be both an action word and an object word or have other multiple meanings, creating multiple entries in the catalogue for that word, placing that word into each group to which it may belong and treating each occurrence of that word as a unique word item within the catalogue;

giving each word item entered in the catalogue a unique reference value which identifies it as a unique object within the catalogue of words, said reference value denoting the unique place the word occupies in the organizational system, whether it is a member of an action word group, object word group, or other word group and its position within the group category's hierarchy of class/subclass;

offering said word catalogue to a user, who selects, one at a time, word choices from the catalogue in a fixed choice protocol based upon whether they are nouns, verbs or modifiers;

allowing the user to link the word choices together in any possible combination to form a meaningful language statement as a preference characteristic of a user, for the purpose of expressing an intention;

giving each said preference characteristic a descriptive name relating to an aspect of said preference characteristic;

offering said system of meaningful language statement creation to multiple individuals in order to create a uniform communication tool and communication platform between multiple parties; and transferring said meaningful language statements between two parties for a designed interaction between them.

8. The method of communication recited in claim 7 further comprising the steps of:

providing a user interface for enabling said transfer of said meaningful language statements between said parties, said user interface comprising computer software for assisting a party to make said word choice selections and for reading said meaningful language statements.

9. The method recited in claim 8 further comprising the step of storing and organizing said meaningful language statements.

10. The method recited in claim 8 further comprising the steps of providing a computer database for storing and organizing said meaningful language statements.

11. The method recited in claim 7 wherein said meaningful language statements are stored and organized in a computer database according to said fixed choice protocol and wherein said user interface is used for associating said meaningful language statements with data for the purpose of indexing, storing, retrieving, labeling and filing said data.

12. The method of communication recited in claim 7 further comprising the step of representing at least one of said meaningful language statements in at least one of pictorial, graphical and auditory form.

13. A method of communication comprising the steps of:

creating a multi-part catalogue of words in a human language so that the catalogue includes categories for various parts of speech, including verbs, nouns and modifier words which are used to modify actions and modifier words which are used to modify objects;

said catalogue consisting of a variety of word choices in every category of said parts of speech;

organizing said catalogue of words according to the following criteria:

creating separate groups for verbs, nouns, modifiers of action words and modifiers of object words; and sorting the words of a language into groups based on the parts of speech to which the words belong, within each separate group, arranging the words in a hierarchical system of class/subclass, set/subset or parent/child object relationship structure, from most general to most specific, wherein members of any subclass/subset in the hierarchy inherently have the same general characteristics as the parent/class word object, but are more specialized versions of the base class or parent class to which they belong;

where a word can be both an action word and an object word or have some other multiple meanings, creating multiple entries in the catalogue for that word, placing that word into each group to which it may belong and treating each occurrence of that word as a unique word item within the catalogue;

giving each word item entered in the catalogue a unique reference value which identifies it as a unique object within the catalogue of words and said reference value denoting the unique place the word occupies in the organizational system, whether it is a member of an action word group, object word group, or other word group and its position within the group category's hierarchy of class/subclass;

offering said word catalogue to a user, who selects one at a time word choices from the catalogue in a fixed choice protocol based upon whether they are nouns, verbs or modifiers;

allowing the user to link the word choices together in any possible combination to form a meaningful language statement as a preference characteristic of a user, for the purpose of expressing an intention;

giving each said preference characteristic a descriptive name relating to an aspect of said preference characteristic;

offering said system of meaningful language statement creation to multiple individuals in order to create a uniform communication tool and communication platform between multiple parties;

transferring said meaningful language statements between two parties for a designed interaction between them;

utilizing said unique word and word linkage combinations for one or more of indexing, storing retrieving, analyzing, comparing and transacting said unique combinations.

14. The method of communication recited in claim 13 further comprising the steps of choosing said contextual meaning as a preference characteristic of a particular user and forming a user profile data file having at least one of said preference characteristics of said user, said preference characteristics being activated or deactivated to express a particular aspect of said user profile.

15. The method of communication recited in claim 14 further comprising the step of assigning to said data file an anonymous user identification index which is not associated with any other form of user identifying information.

16. A method of creating a user-identity organization system for collecting multiple preference characteristics of a user in a data file segmented into meaningful subsets of user preference information called roles; the method comprising the steps of:
a) allowing the user to define a plurality of different subsets of preferences in the form of multiple roles associated with the user;
b) saving such definitions for ongoing use;
c) allowing the user to determine how the role segmenting is organized so that roles may be subsets of other roles in a combination the user chooses;
d) giving each meaningful subset of preference characteristics a descriptive name;
e) identifying which of said role segments are active at a given time by allowing user to choose between said role segments, said choice activating said role statement, thereby indicating that the chosen role segment is the current active subset of their profile;
f) allowing the user to switch between said role segments to indicate changes in their preference characteristics;
g) selecting at least one role statement as the active current choice for identifying the user's preference for a particular purpose at any given time.

17. The method of creating a user-identity organizational system recited in claim 16 wherein the step of preparing a plurality of role statements comprises the steps of:

selecting word choices from a multi-part catalogue of words in a human language which has been organized into categories by taking the following actions:

sorting words into groups based on the parts of speech to which the words belong;

arranging each group of words in a hierarchical system of class/subclass, set/subset or parent/child object relationship structure, from most general to most specific, wherein members of any subclass/subset in the hierarchy inherently have the same general characteristics as the parent/class word object, but are more specialized versions of the parent class to which they belong;

giving each word meaning a unique reference value which identifies it as a unique object within the catalogue of words and said reference value denoting the unique place the word occupies in the organizational system, which category of words it belongs to, and its position within the group category's hierarchy of class/subclass;

offering said word catalogue to a user, who selects one at a time word choices from the catalogue in a fixed choice protocol based upon whether they are nouns, verbs or modifiers; and allowing the user to link the word choices together for form a meaningful language statement, for the purpose of expressing an intention; and storing said meaningful language statement as a statement.

18. The method of creating a user-identity organizational system recited in claim 17 further comprising the step of assigning to said data file an anonymous user identification index which is not associated with any other form of user identifying information.

19. The method of creating a user-identity organizational system recited in claim 17 further comprising the steps of encrypting said data file.

20. The method recited in claim 17 further comprising the step of storing and organizing said role statements.

21. The method recited in claim 17 further comprising the step of providing a computer database for storing and organizing said role statements.

22. The method recited in claim 17 wherein said role statements are stored and organized in said computer database according to said fixed protocol and wherein said user interface is used for indexing, labeling and filing data.

23. The method of creating a user-identity organization system as recited in claim 16 further comprising the step of associating at least one of said role statements with at least one of a visual, auditory and other non-verbal form.

* * * * *